(12) United States Patent
McJunkin et al.

(10) Patent No.: US 7,094,989 B2
(45) Date of Patent: Aug. 22, 2006

(54) WELDING APPARATUS AND METHODS FOR USING ULTRASONIC SENSING

(75) Inventors: Timothy R. McJunkin, Idaho Falls, ID (US); John A. Johnson, Ashland, OR (US); Eric D. Larsen, Idaho Falls, ID (US); Herschel B. Smartt, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 275 days.

(21) Appl. No.: 10/828,560

(22) Filed: Apr. 12, 2004

(65) Prior Publication Data

US 2005/0224477 A1    Oct. 13, 2005

(51) Int. Cl.
*B23K 9/127* (2006.01)
(52) U.S. Cl. .................. 219/124.34; 73/624
(58) Field of Classification Search ........... 219/124.34; 73/624
See application file for complete search history.

(56) References Cited

U.S. PATENT DOCUMENTS

| 4,206,511 A | 6/1980 | Ries et al. |
| 4,289,030 A | 9/1981 | Alers et al. |
| 4,298,785 A * | 11/1981 | Krenzer et al. ........ 219/124.34 |
| 4,588,873 A | 5/1986 | Fenn et al. |
| 4,672,852 A | 6/1987 | Gugel et al. |
| 5,583,292 A | 12/1996 | Karbach et al. |
| 6,155,117 A | 12/2000 | Stevens et al. |
| 6,484,584 B1 * | 11/2002 | Johnson et al. ............... 73/624 |

FOREIGN PATENT DOCUMENTS

| DE | 1905302 A | * | 8/1970 |
| DE | 3543681 A1 | * | 6/1987 |
| JP | 56-19982 A | * | 2/1981 |

* cited by examiner

*Primary Examiner*—Clifford C. Shaw
(74) *Attorney, Agent, or Firm*—Wells St. John P.S.

(57) ABSTRACT

A welding apparatus using ultrasonic sensing is described and which includes a movable welder having a selectively adjustable welding head for forming a partially completed weld in a weld seam defined between adjoining metal substrates; an ultrasonic assembly borne by the moveable welder and which is operable to generate an ultrasonic signal which is directed toward the partially completed weld, and is further reflected from same; and a controller electrically coupled with the ultrasonic assembly and controllably coupled with the welding head, and wherein the controller receives information regarding the ultrasonic signal and in response to the information optimally positions the welding head relative to the weld seam.

74 Claims, 7 Drawing Sheets

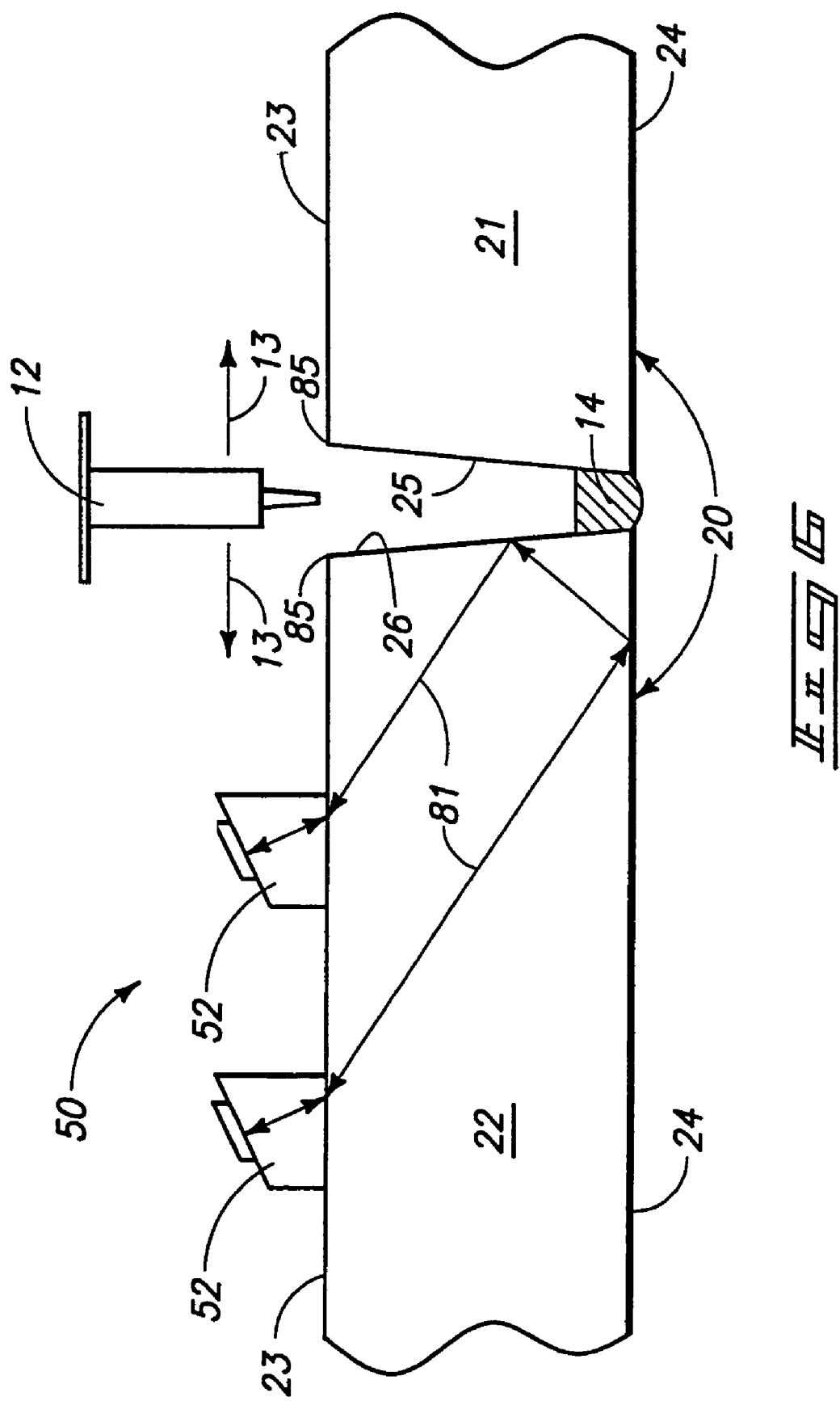

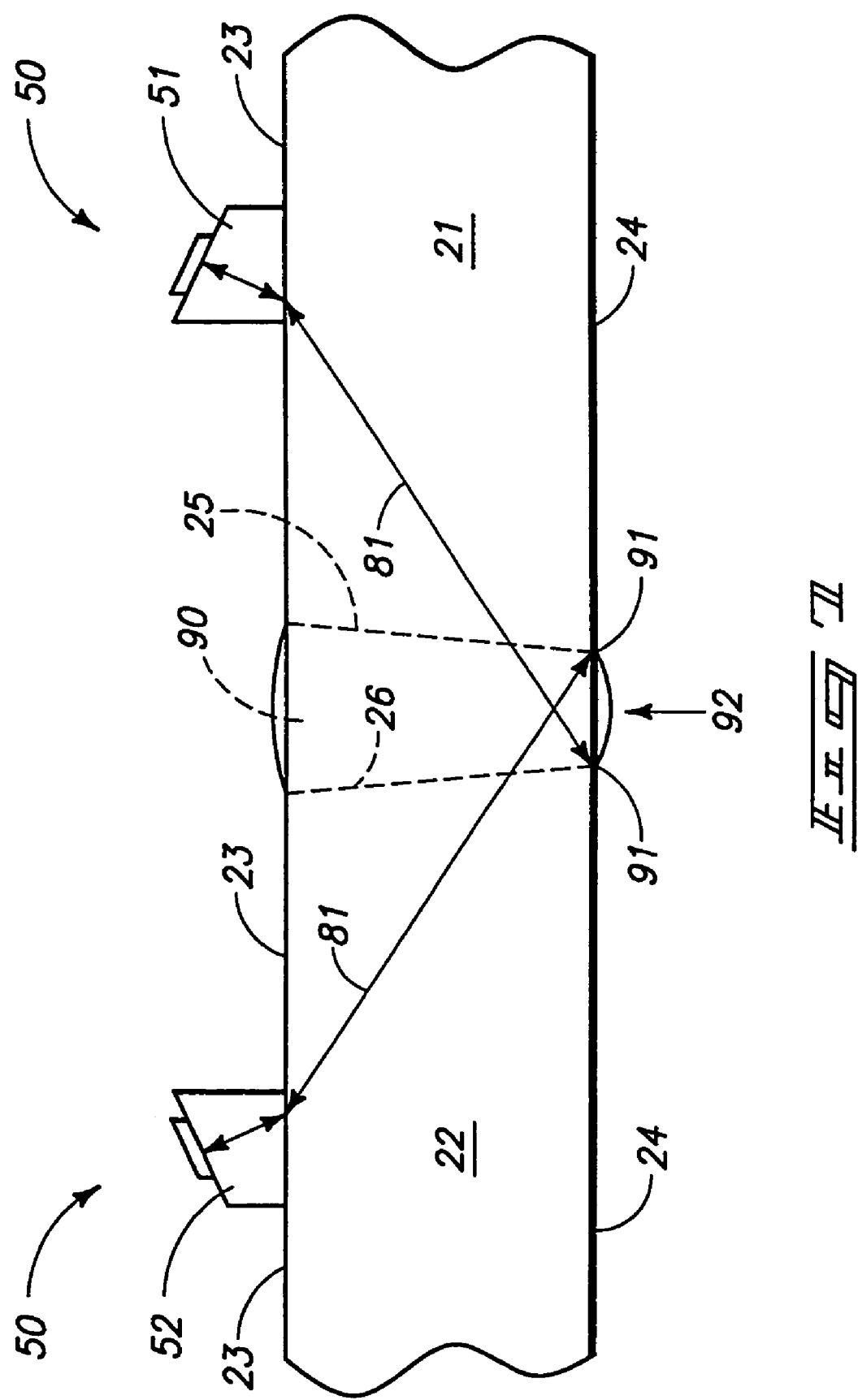

WELDING APPARATUS AND METHODS FOR USING ULTRASONIC SENSING

CONTRACTUAL ORIGIN OF THE INVENTION

This invention was made with United States Government support pursuant to Contract No. DE-AC07-99ID13727 between the United States Department of Energy and Bechtel BWXT Idaho, L.L.C. The United States Government has certain rights in the invention.

TECHNICAL FIELD

The present invention relates to a welding apparatus and methods for using ultrasonic sensing.

BACKGROUND OF THE INVENTION

Automated movable welders are familiar to those who are skilled in the art, and therefore, a detailed discussion of these devices is neither warranted nor necessary for an understanding of the present invention. Such automated movable welders are described in several U.S. Pat. Nos. 6,178,819; 6,125,705; and 4,712,722, the teachings of which are all incorporated by reference. Nevertheless, for an understanding of the present invention, it should be appreciated that automated movable welders are operable to be attached to a given object which is to be welded. The automated welder then typically moves repeatedly along a prescribed path of travel to achieve a given welding objective.

For an automated welder to create a quality weld, it is important that the welding head borne by the welder be correctly positioned relative to the joint or seam between the two pieces of metal which are being welded. It is also important that this correct positional relationship be maintained as the automatic welder travels along the seam during the welding process.

During mechanized or automated welding, the prescribed path of the automated movable welder is typically guided by a track so that the welding head will follow a definite path along the seam or joint to be welded. Maintenance of the correct positional relationship between the welding head and the seam typically relies upon the precise positioning of the pieces to be welded, the correct positioning of the track on which the welder travels, and on the precise operation of the automated welder. Unfortunately, problems such as the imprecise positioning of the pieces to be welded, or incorrect positioning of the track, or malfunction in the operation of the automated welder may individually or in combination cause the welding head to be unsatisfactorily positioned relative to the seam with the result that the quality of the weld is diminished. Such unsatisfactory positioning of the welding head is commonly referred to as "mis-tracking", and is highly undesirable.

Several devices to address the aforementioned problem, and which use optical and arc voltage sensing processes have been developed in an effort to provided more accurate tracking of the weld seam during on-going welding processes. In this regard, optical seam tracking methods typically use a laser to display a line or other pattern on the weld seam, ahead of the welding head. The resulting image, line, or pattern is then automatically interpreted by the welder to reveal the position of the weld seam. The automated welder then appropriately positions the welding head to more accurately track the weld seam.

Further, to the foregoing, arc voltage sensing systems are available and operate on the principal that the arc voltage will vary relative to the distance that the welding head is from the sidewall of the seam which is being welded. Therefore, by measuring the arc voltage during the welding process, the position of the welding head relative to the seam can be approximated, and the position of the welding head may then be appropriately adjusted to more accurately track the weld seam.

While these prior art devices and methods have operated with varying degrees of success, there have been shortcomings which have detracted from their usefulness. For example, in regards to the optical sensing processes, such as previously described, these systems must normally operate in the presence of a high level of ambient light which is emitted by the welding process, and which may fluctuate significantly over time. In this regard, when ambient light is reflected from the surrounding surfaces of the weld preparation it on occasion interferes with the interpretation of the image which is used by optical sensing process to reveal the correct position of the weld seam. Although these aforementioned problems associated with the ambient light may be alleviated, to some degree, through the use of highly specialized optical filters, such problems cannot be completely eliminated. Additionally, the welding process often produces smoke or fumes which may further distort or obscure relevant portions of the image. This of course, interferes with the interpretation of any resulting image.

Regarding the arc voltage sensing systems previously described, although such systems may be used to track weld seams formed by arc welding, such systems cannot be used to track weld seams formed by laser welding, electron beam welding, or other welding processes that do not use an arc. Additionally, the arc voltage sensing process does not work particularly well when the joint to be welded is nearly filled, and little sidewall remains to influence the arc voltage. Yet further, some arc welding processes, such as gas metal arc welding, inherently demonstrate significant fluctuations in arc voltage which may additionally interfere with accurate weld seam tracking.

In view of the foregoing, it would be highly desirable to provide a method and apparatus which facilitates accurate tracking of weld seams during the welding process, while substantially avoiding these and other perceived shortcomings of the prior art devices.

OBJECTS AND SUMMARY OF INVENTION

Therefore, one aspect of the present invention is to provide an apparatus which facilitates accurate tracking of weld seams during the welding process.

Another aspect of the present invention is to provide a welding apparatus which utilizes ultrasonic sensing, and which further includes a movable welder having a selectively adjustable welding head for forming a partially completed weld in a weld seam which is defined between adjoining metal substrates; an ultrasonic assembly borne by the moveable welder and which is operable to generate an ultrasonic signal which is directed toward the partially completed weld, and is further reflected from same; and a controller electrically coupled with the ultrasonic assembly and controllably coupled with the welding head, and wherein the controller receives information regarding the ultrasonic signal and in response to the information optimally positions the welding head relative to the weld seam.

Another aspect of the present invention is to provide a welding apparatus which utilizes ultrasonic sensing, and which further includes a moveable welder having a selectively adjustable welding head for forming a partially completed weld in a weld seam defined between adjoining metal substrates; an ultrasonic assembly borne by the moveable welder for generating an ultrasonic signal which is directed toward the partially completed weld, and wherein the ultrasonic signal strikes the partially completed weld and is reflected back in the direction of the ultrasonic assembly; a timing assembly for calculating a time it takes for the ultrasonic signal to be transmitted and returned to the ultrasonic assembly; and a controller electrically coupled with the timing assembly, and which determines from the time, a distance that the ultrasonic assembly is from the partially completed weld.

Another aspect of the present invention is to provide a welding apparatus which utilizes ultrasonic sensing, and which further includes a moveable welder having a selectively adjustable welding head for forming a partially completed weld in a weld seam defined between adjoining metal substrates; an ultrasonic assembly borne by the moveable welder for generating an ultrasonic signal along a surface of the metal substrates, and which is directed toward the partially completed weld, and wherein the ultrasonic signal strikes the partially completed weld and is reflected back in the direction of the ultrasonic assembly; a timing assembly for calculating a time it takes for the ultrasonic signal to be transmitted and returned to the ultrasonic assembly; and a controller electrically coupled with the timing assembly and which utilizes the time to calculate a distance that the ultrasonic generator is from the partially completed weld.

Another aspect of the present invention is to provide a welding apparatus which utilizes ultrasonic sensing, and which further includes a movable welder having a selectively adjustable welding head for forming a partially completed weld in a metal substrate; an ultrasonic assembly borne by the moveable welder for generating an ultrasonic signal which is directed toward the partially completed weld, and wherein the ultrasonic signal is reflected from a bottom surface of the metal substrate before striking the partially completed weld, and wherein the ultrasonic signal strikes the partially completed weld and is reflected back in the direction of the ultrasonic assembly; a timing assembly for calculating a time it takes for the ultrasonic signal to be transmitted and returned to the ultrasonic assembly; and a controller electrically coupled with the timing assembly and determining from the time, a distance that the ultrasonic assembly is from the partially completed weld.

Another aspect of the present invention is to provide a method of welding which utilizes ultrasonic sensing, and which further includes providing a moveable welder having a selectively adjustable welding head for forming a partially completed weld; providing an ultrasonic assembly borne by the moveable welder for generating an ultrasonic signal which is directed toward the partially completed weld, and wherein the ultrasonic signal strikes the partially completed weld and is reflected back in the direction of the ultrasonic assembly; calculating a time that it takes for the ultrasonic signal to be transmitted and returned to the ultrasonic assembly; and determining from the time, a distance that the welding head is from the partially completed weld.

These and other aspects of the present invention will be discussed in further detail below.

BRIEF DESCRIPTION OF THE DRAWINGS

Preferred embodiments of the invention are described below with reference to the following accompanying drawings.

FIG. 6 is a fragmentary, transverse, vertical, sectional view taken through two metal substrates, and which shows yet another path of travel of several ultrasonic signals in the respective metal substrates.

FIG. 7 is a transverse, vertical sectional view taken through two metal substrates to be joined and which shows still another path of travel of several ultrasonic signals in the respective metal substrates.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
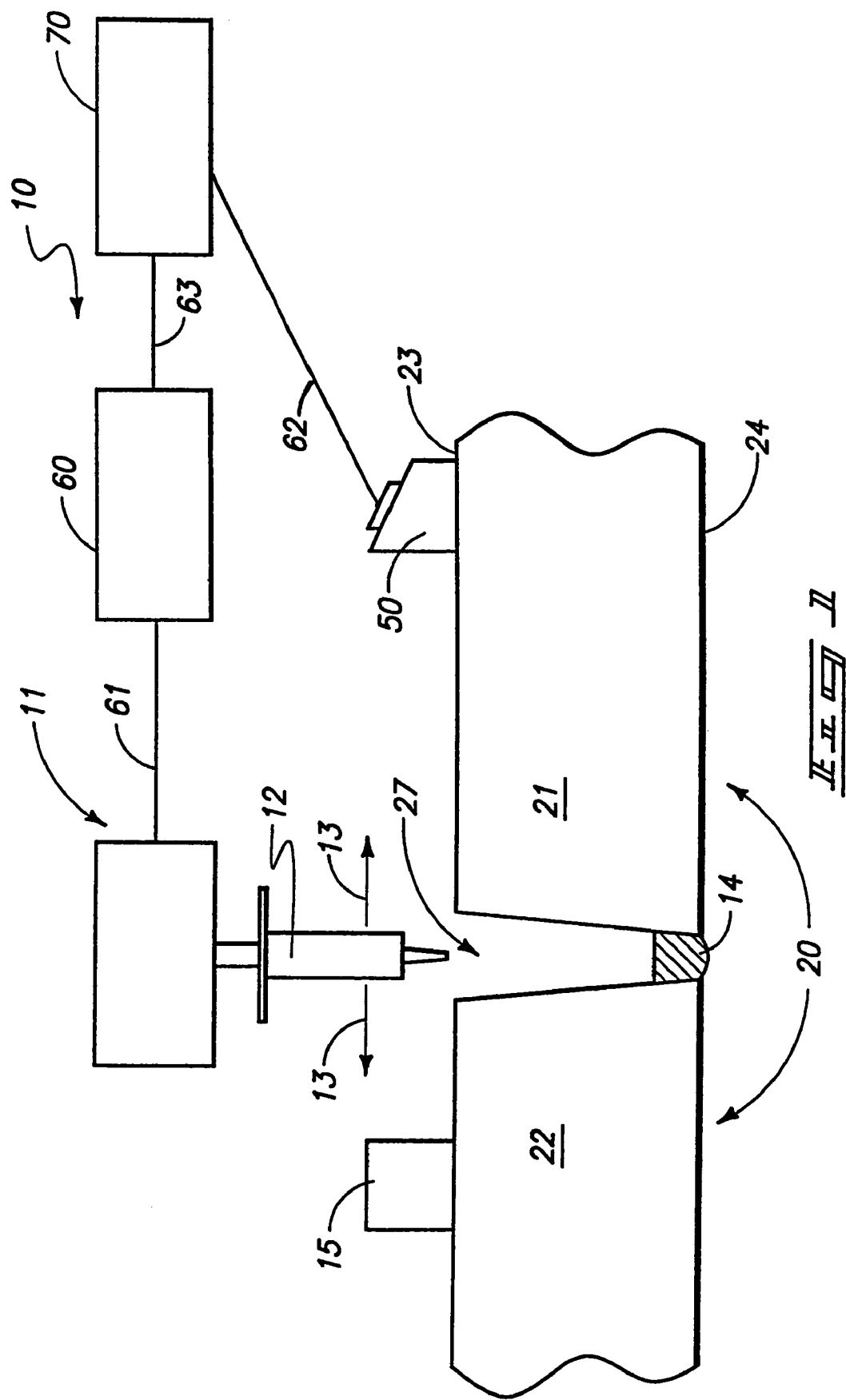
FIG. 1 is a greatly simplified, fragmentary view of a first form of the present invention.
Figure 2:
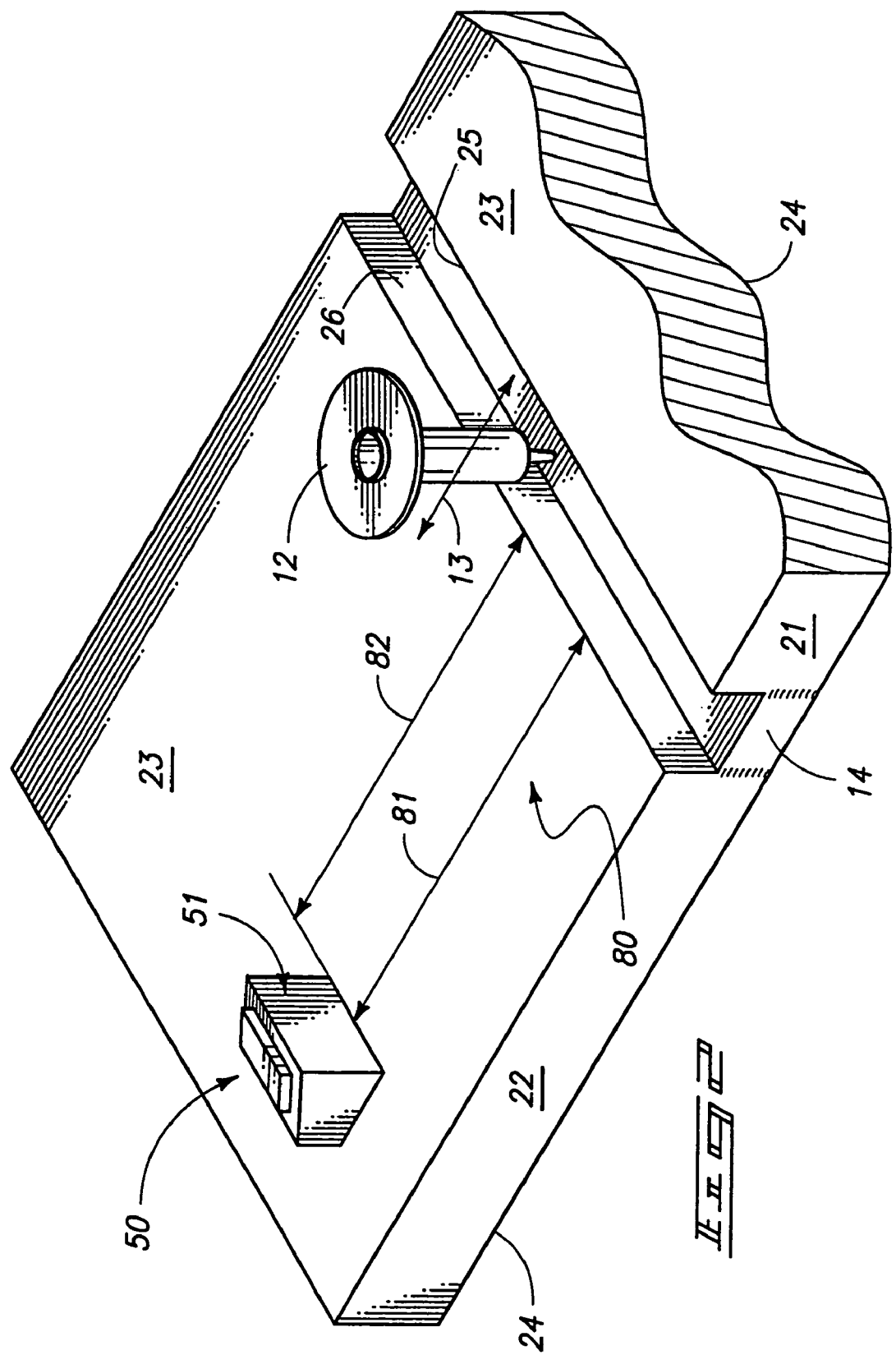
FIG. 2 is a greatly simplified, fragmentary view of a second form of the present invention.

The welding apparatus using ultrasonic sensing of the present invention is best seen by reference to FIG. 1 and is generally indicated by the numeral 10. As seen therein, a welding device or other automated movable welder 11 is fragmentarily and schematically represented and is familiar to those who are skilled in the art. Therefore, a detailed discussion of this device is neither warranted nor necessary for an understanding of the further invention. However, it should be appreciated that the automated movable welder 11 is operable to attach to a given object which is to be welded. In this regard, the automated welder 11 moves repeatedly along a welding track 15 which prescribes a path of travel to achieve a given welding objective on an object of interest. As seen in FIG. 1, the automated movable welder 11 includes a welding head which is generally indicated by the numeral 12, and which has a power supply (not shown) connected thereto. The power supply provides the necessary electricity to perform the welding activity which will be discussed, hereinafter. As seen in FIG. 1, the welding head 12 is rendered movable along a path of travel 13 which is generally transversely oriented relative to a partially completed weld which is indicated by the numeral 14. The automated movable welder 11 is operable to weld a given object of interest, here illustrated as a substrate which is designated by the numeral 20. The substrate comprises first and second sections, or portions 21 and 22, respectively, and which are positioned in juxtaposed relation, one to the other. Each of the sections 21 and 22 include a top surface 23; an opposite bottom surface 24; and opposite side walls indicated by the numerals 25 and 26, respectively (as shown in FIG. 2). The opposite side walls define the weld seam 27 within which the partially completed weld is located.

Figure 3:
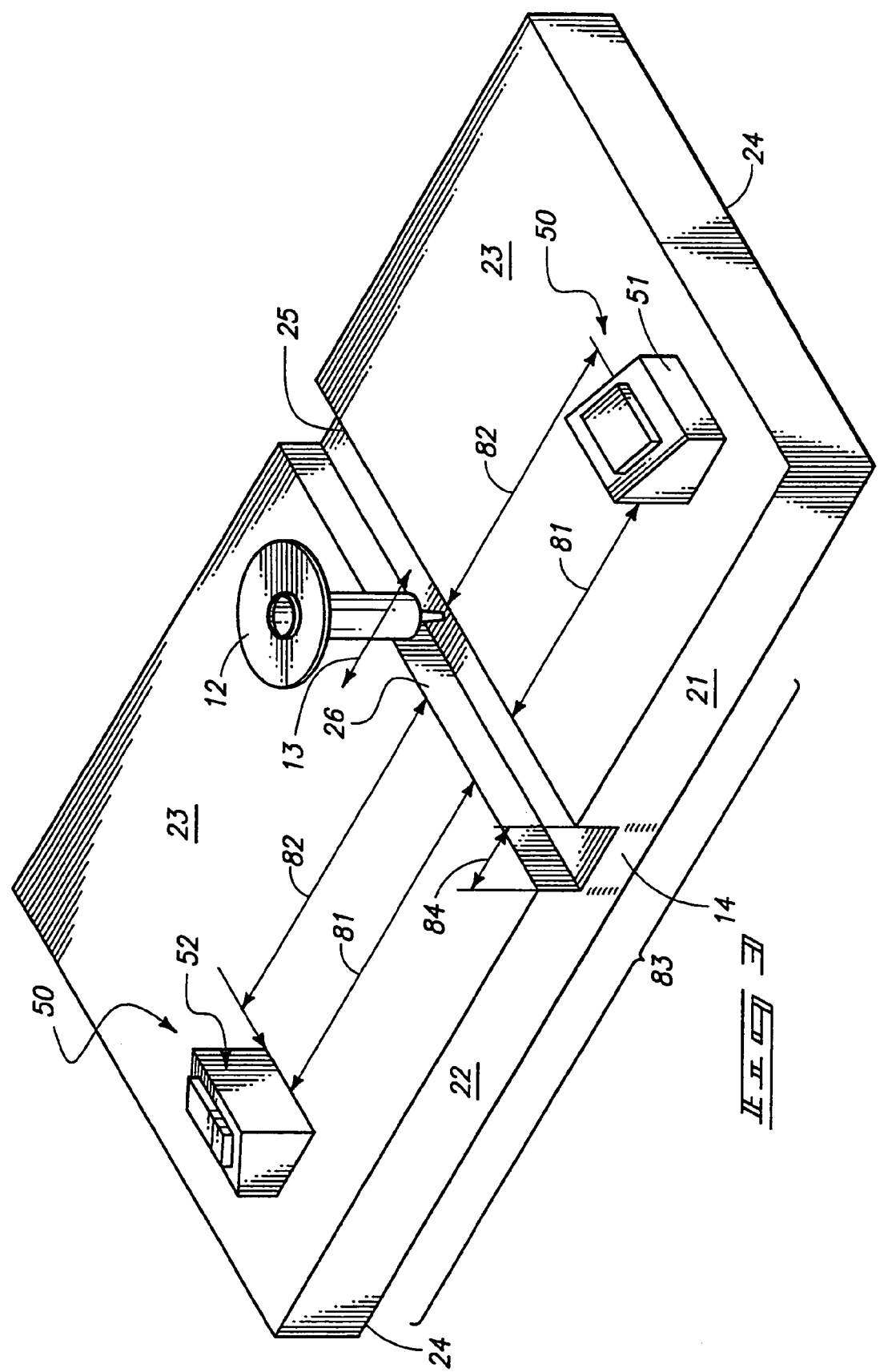
FIG. 3 is a fragmentary, transverse, vertical, sectional view taken through two metal substrates to be joined, and which shows the paths of travel of several ultrasonic signals in the respective metal substrates.

As seen in FIG. 1, the apparatus 10 of the present invention includes an ultrasonic signal generator 50 which is moveably mounted on the automated movable welder 11, and which generates an ultrasonic signal which is directed towards one of the sides 25 or 26 of the partially completed weld 14. As seen in FIG. 3, the ultrasonic signal generator may include first and second ultrasonic signal generators 51 and 52, respectively which are oriented or otherwise deployed on the opposite first and second portions 21 and 22 of the substrate 20. As seen in FIG. 1, a controller 60 such as a programmable logic controller, or similar assembly is electrically coupled by means of first and second electrical pathways 61 and 63, respectively to the automated movable welder 11; and a timing assembly which is generally indicated by the numeral 70. Timing assembly 70 is electrically coupled to ultrasonic generator 50 by means of electrical pathway 62. It should be understood that the first electrical pathway 61 permits the controller 60 to send various electrical signals which cause the automated movable welder 11 to move along the welding track 15 and further to adjust the welding head 12 along the path of movement 13 which is generally transversely related relative to the orientation of the partially completed weld 14. Yet further, the controller 60 is operable to transmit electrical signals which cause the first and second ultrasonic signal generators 51 and 52 to generate or produce ultrasonic signals, which will be discussed hereinafter, and which travel in the individual portions 21 and 22 of the substrate 20. In addition to the foregoing, the respective ultrasonic signal generators 50 are operable to receive reflected or other ultrasonic signals traveling in the individual portions and then return corresponding electrical signals to the controller and the timing assembly by way of the second and third electrical pathways 62, 63 for further processing which will be discussed hereinafter.

The welding apparatus 10 of the present invention which uses ultrasonic sensing includes, as earlier discussed, a moveable welder 11 having a selectively adjustable welding head 12 for forming a partially completed weld 14 between adjoining metal substrates 21 and 22, respectively. The welding apparatus 10 includes an ultrasonic signal generator or assembly 50 which is borne by the moveable welder 11, and which is operable to generate an ultrasonic signal which is directed to the partially completed weld 14, and is further reflected from same as seen in FIG. 2 and following. A controller 60 is provided and which is coupled with the timing assembly 70 and is further controllably coupled with the welding head 12. The controller 60 receives information regarding the ultrasonic signal from an accompanying timing assembly 70, and in response to this information, optimally positions the welding head 12 along the path of movement 13 relative to the weld seam 27 which is defined between the side walls 25 and 26 of the individual substrates 21 and 22.

Referring now to FIG. 2, it will be seen and understood that ultrasonic energy 80, which is generated by the ultrasonic signal generator or assembly 50, moves through solid objects and is reflected from geometrical structures. In the present invention 10, the ultrasonic or acoustic waves that are emitted from the ultrasonic signal generator 50 are operable to travel from that assembly towards a geometrical feature of the partially completed weld 14. As seen in the drawings, these same ultrasonic signals are reflected and received by the same ultrasonic signal generator. Thereafter, the timing of the received reflection of those same ultrasonic waves or energy 80 can then be used to calculate the distance from the ultrasonic signal generator 50 to the feature of the weld preparation which supplied or provided the reflection. Based upon this timing information, the controller 60 proceeds to immediately and appropriately position the weld head 12 so that it is positioned correctly relative to the partially completed weld 14. In FIG. 2, a first form of the invention is shown and wherein a single ultrasonic signal generator 50 is disposed in substantially, laterally, outwardly disposed relation relative to the partially completed weld 14 and which produces an ultrasonic surface wave. As seen in that drawing, line 81 indicates the path of the ultrasonic energy 80 towards the side wall 26 of the second portion 22. Further, line 82 represents the distance of the same sound path. Consequently, the total time for the ultrasonic energy 80 to travel from the ultrasonic generator 50 to the geometrical feature (26) and back, can be calculated as twice the distance 82, divided by the speed of the ultrasonic energy in the substrate 22 which is being welded.

Referring now to FIG. 3, a pair of transducers or ultrasonic generators 51 and 52 are shown. Each of the respective transducers are positioned on the opposite sides of the partially completed weld 14. Again, in FIG. 3, the path of the ultrasonic energy emitted from the respective ultrasonic generators 51 and 52 is indicated by the line labeled 81, and the distances from the individual side walls 25 and 26, and which defines the weld seam 27 is indicated by the lines labeled 82. Yet further, it will be seen that the distances between the two ultrasonic generators 51, 52 is labeled by the line 83. Still further, the width of the weld preparation or partially completed weld is indicated by the line labeled 84. It should be understood that with two ultrasonic generators 51 and 52 generating ultrasonic energy traveling along these paths 81, as described above, an average time can be calculated and which then can be used to determine either the speed of the ultrasonic energy in the substrate 20, or the width of the weld preparation. In this regard, it has been determined that measuring the speed of the ultrasonic energy in the substrate 20 is important in the present invention inasmuch as it is known that the velocity of ultrasonic energy varies with temperature. Yet further, measuring the width of the partially completed weld is important for purposes of correctly positioning the welding head 12 to produce an appropriate correctly formed partially completed weld 14.

As will be appreciated, if the partially completed weld 14 were perfectly centered between the two ultrasonic generator 51 and 52 as seen in FIG. 3, the calculated times for the ultrasonic energy generated from same to travel to and return from the respective side walls 25 and 26 to the respective ultrasonic generators 50 would be identical. In one aspect of the invention therefore, the differences in these calculated times can be employed to insure that the respective ultrasonic generators 50 are substantially centered or equidistant relative to the partially completed weld 14. In the prior art, these respective ultrasonic generators 50 can be attached to a movable framework or gantry (not shown) that is capable of moving the transducers either individually or in unison in a direction which is substantially laterally outwardly disposed relative to the partially completed weld 14. In contrast to the prior art, and in the present arrangement the controller 60 is provided and which is useful in keeping these calculated times substantially similar thus keeping the respective ultrasonic generators 50 substantially centered relative to the partially completed weld. Still further, maintaining various positions for the respective ultrasonic generators 50, in several prior art references, allows the respective ultrasonic generators to be employed to detect flaws in the weld preparation. In contrast, and in the present invention 10, locating flaws in the partially completed weld 14 can be determined by utilizing the calculated times as noted above, but only if the relative position of the respective ultrasonic generators 50 is known and maintained. In this regard, errors in the position of the individual ultrasonic generators 50 could cause misinterpretation of the resulting data and mislocation or misidentification of flaws in the partially completed weld 14.

Figure 4:
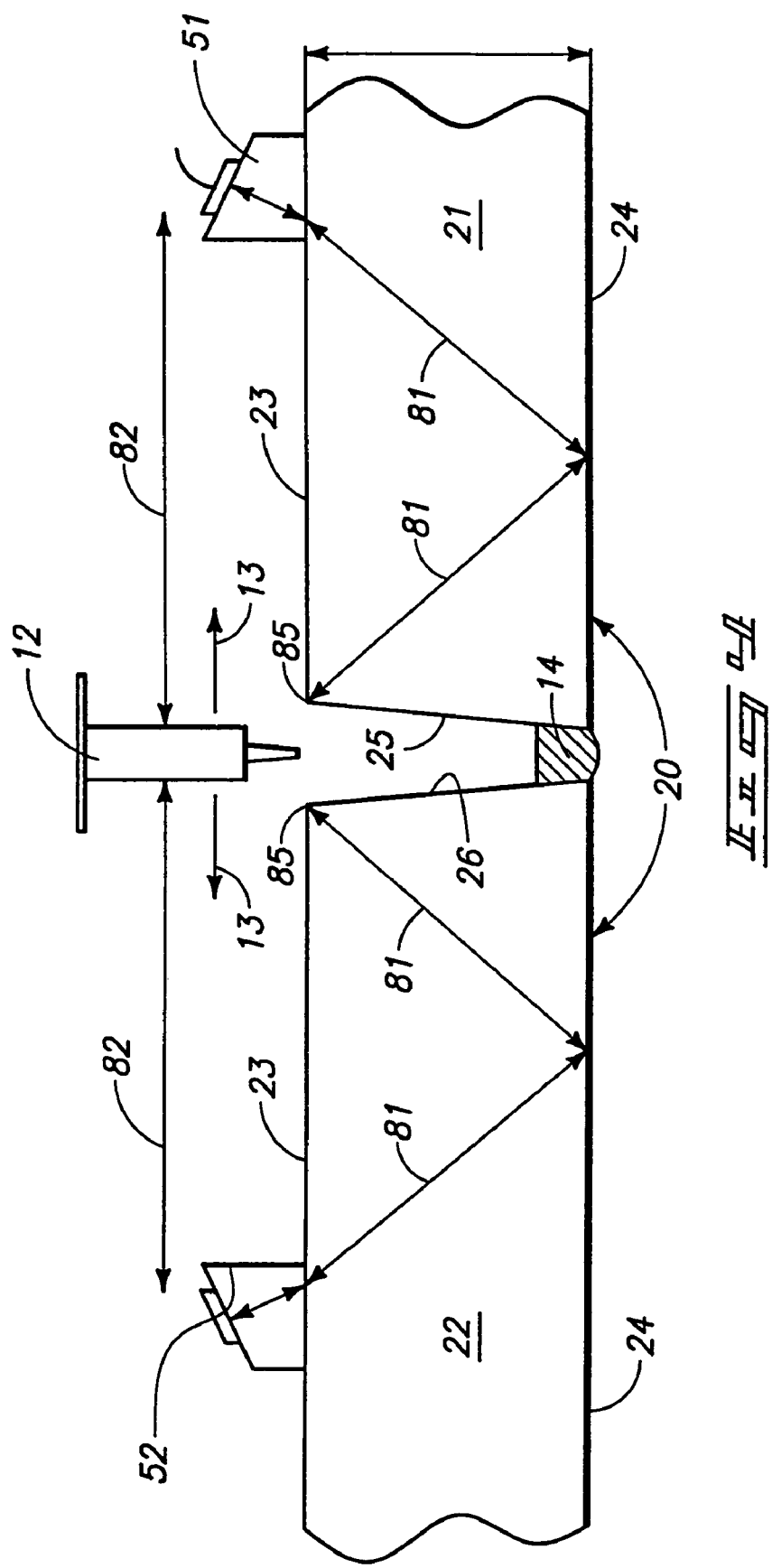
FIG. 4 is a fragmentary, transverse, vertical, sectional view taken through two metal substrates to be joined, and which shows alternative paths of travel of several ultrasonic signals in the respective metal substrates.

Another form of the invention is best understood by a study of FIG. 4. In this form of the invention 10, the ultrasonic energy 80 is sent into the individual portions 21 and 22 and reflects from the bottom surface 24 thereof. As seen, the reflected ultrasonic energy arrives at a corner 85 of the respective sidewalls 25 and 26. In this regard, a corner 85 appears to be an excellent reflector of ultrasonic energy 80 and provides a large echo or reflection returning to the ultrasonic signal generator 50. Based upon this geometry, and the time required to transmit and then receive the reflected ultrasonic energy the controller 60 can then, by way of the timing assembly 70, appropriately locate the welding head 12 to form the partially completed weld 14.

Figure 5:
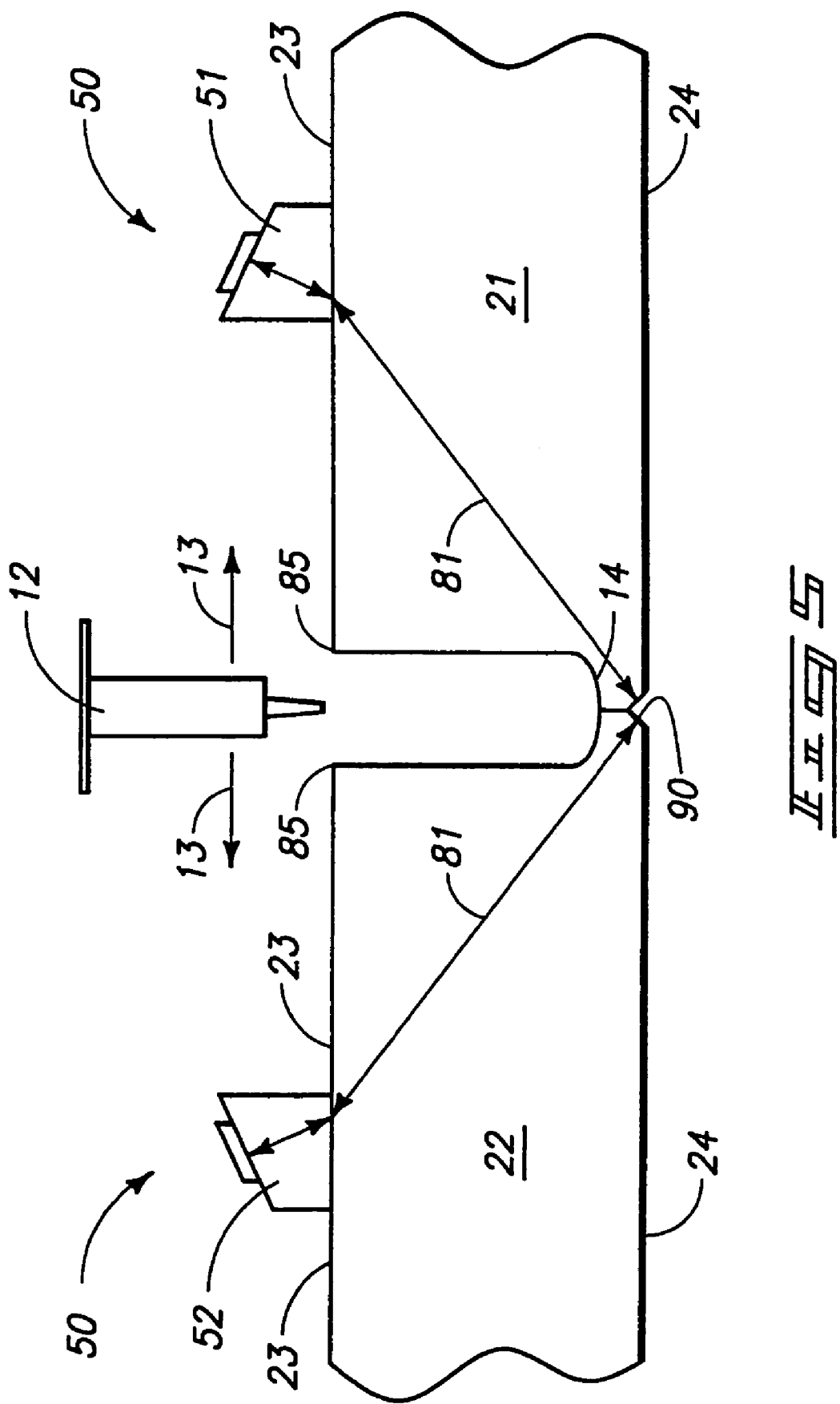
FIG. 5 is a fragmentary, transverse, vertical, sectional view taken through two metal substrates to be joined, and which shows alternative paths of travel of several ultrasonic signals, in the respective metal substrates.

Referring now to FIG. 5, another form of the invention is shown and wherein the ultrasonic sound wave 81 is reflected from the root 90 of the partially completed weld 14. Similarly, the time (from generation to reflected receipt) is calculated by the timing assembly 70, and can be utilized to then appropriately positioned the welding head 12 relative to the partially completed weld 14.

Referring now to FIG. 6, another form of the invention is shown, and wherein the ultrasonic signal generators 51 and 52 are each located on the same portion. 21 or 22 of the substrate 20. As seen, the path 81 of the ultrasonic energy travels back and forth between the first and the second ultrasonic generators 51 and 52 and reflects off of the bottom surface 24, and the sidewall 26. Based upon the time of travel of the ultrasonic energy between the two ultrasonic generators 51 and 52, the correct positioning of the sidewall can be ascertained and thereafter, the controller 60 can correctly position the welding head 12 to form the partially completed weld 14.

Referring now to FIG. 7, another alternative form of the present invention is shown and wherein it is utilized to correctly position or locate a completed weld 90 which is shown in phantom lines. For example, under some circumstances, an inspection of a completed weld 90 may be required. In this instance, the accurate positioning of an appropriate ultrasonic generator/receiver 50 relative to the weld 90 is required. As seen in FIG. 7, the ultrasonic energy travels along the paths 81 and is reflected from the corners 91 of the respective portions 21 and 22. This use of the invention assumes that the root penetration 92 is symmetrical about the original weld preparation. By locating the ultrasonic generators so that the reflected ultrasonic energy is received at approximately the same time at each location will substantially insure that an invention for inspecting the weld is substantially appropriately located relative to the weld 90.

Operation

The operation of the described embodiments of the present invention are believed to be readily apparent, and are briefly summarized at this point. In its broadest aspect, the present invention relates to a welding apparatus 10 using ultrasonic sensing and which includes a moveable welder 11 having a selectively adjustable welding head 12 for forming a partially completed weld 14 in a weld seam 27 which is defined between adjoining metal substrates 21 and 22. An ultrasonic assembly 51, 52 is borne by the movable welder 11 and is further operable to generate an ultrasonic signal 81 which is directed towards the partially completed weld 14 and is further reflected from same. A controller 60 is electrically coupled with the timing assembly 70 which in turn is coupled with the ultrasonic assembly 50 and controllably coupled with the welding head 12. The controller 60 receives information regarding the ultrasonic signal 81 and in response to the information optimally positions the welding head relative to the welding seam 27.

In a first form of the invention as seen in the drawings, the ultrasonic signal 81 is reflected back from the partially completed weld 14 and received by the ultrasonic assembly 51, 52. The information regarding the received ultrasonic signal is provided to the controller 60 by way of the electrical pathway designated by the numerals 62 and 63. As seen in FIG. 1, the apparatus further includes a timing assembly 70 which is electrically coupled by way of the electrical pathway 63 with the controller 60 and which is operable to calculate the time it takes for the ultrasonic signal 81 to be transmitted and returned to the ultrasonic assembly 50. The timing assembly 70 is operable to calculate an average time from the information received from the ultrasonic sensor, and provide that same information to the controller 60 to position the welding head 12 to substantially track the partially completed weld 14. As earlier discussed, this average time is calculated by the timing assembly 70 and is utilized, in one form of the invention, to calculate a sound speed which is utilized to position the welding head 12 to track the partially completed weld 14. Yet further in another form of the invention, as described earlier, the timing assembly calculates the time it takes for the ultrasonic signal 81 to be transmitted and returned to the ultrasonic assembly 51 and 52 and from this information the controller 60 determines a width dimension of the partially completed weld 14. This information on the width may further be utilized to correctly position the welding head 12 relative to the partially completed weld.

In yet another form of the invention, the ultrasonic signal which is sent and reflected is utilized to correctly position the ultrasonic assembly 51 and 52 relative to the partially completed weld. In still another form of the invention as disclosed, two ultrasonic assemblies 51 and 52 are separated by a predetermined distance and located on the same side of the partially completed weld 14. In this arrangement, the ultrasonic signal is utilized to position the welding head 12 to track the partially completed weld 14 by way of reflecting ultrasonic energy 80 from the bottom surface 24 and sidewall 25, 26 of a portion 21 or 22 of the substrate 20 to be joined. In yet other forms of the invention, the partially completed weld has a corner, a root, or other geometric structure with which the ultrasonic energy is reflected back to the ultrasonic signal generator 50. From this information and the timing provided by the timing assembly 70, the correct location of the welding head 12 relative to the partially completed weld 14 is determined. As noted above, the ultrasonic signal 81, which is provided, may include a surface wave, a shear wave or a longitudinal wave.

Another aspect of the invention is the use of an algorithm to filter the return time. This is required due to varying strength of the ultrasonic reflection, such as poor ultrasonic coupling or defects in the weld preparation. The times used in calculating the position error are filtered with an adaptable length moving average. The length of the moving average varies based on the confidence in the current time. A confidence factor varies from 1 to 10 based on the number of times in a row in which the signal was successfully acquired. The moving average length is the confidence factor. The length of a moving average determines the rate at which errors accumulate in the average. Therefore, a low confidence will allow for a fast convergence to a signal and a high confidence will reject changes in the error until they are repeated over consecutive iterations. The confidence factor is also used in determining the time window in which to accept the reflected signal. If the confidence is high the window is narrow around the current moving average time because the position error is not expected to change suddenly. If the confidence is low, (meaning the signal has not been found for several iterations) the time window is wider to allow for the possible introduction of positioning error that may have occurred in the intervening iterations.

The confidence value of each side of the weld is initialized to a minimum value, for example 1. On each successive iteration where the signal is successfully located within the time window, the confidence factor is increased by 1 until the iteration where it reaches the maximum value of, for example, 10. On each successive iteration where a signal is not successfully found within the time window, the confidence factor is reduced by 1, unless it is at the minimum value. This method provides for the fast convergence at the beginning of the process, due to the minimum length of the moving average. If in an iteration signals are successfully acquired in the time window on both sides of the weld, the sound speed is adjusted based on the moving average times. Without new data from both sides, the assumption is made that the tracking and not the sound speed changed the time and the other moving average is adjusted accordingly.

In view of the foregoing, it is seen that a novel welding apparatus 10 which is used to track a partially completed weld 14 is provided and which optimally positions the welding head 12 relative to the partially completed weld 14 while also simultaneously performing other desirable functions while avoiding the determents associated with the prior art practices.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A welding apparatus using ultrasonic sensing, comprising:
   a movable welder having a selectively adjustable welding head for forming a partially completed weld in a weld seam defined between adjoining metal substrates;
   an ultrasonic assembly borne by the moveable welder and which is operable to generate an ultrasonic signal which is directed toward the partially completed weld, and is further reflected from same;
   a controller electrically coupled with the ultrasonic assembly and controllably coupled with the welding head, and wherein the controller receives information regarding the ultrasonic signal and in response to the information optimally positions the welding head relative to the weld seam; and
   a timing assembly electrically coupled to the controller for calculating an average time that it takes the ultrasonic signal to be transmitted and returned to the ultrasonic assembly, and wherein the average time is utilized by the controller to position the welding head to track the partially completed weld.

2. An apparatus as claimed in claim 1, wherein the ultrasonic signal is reflected back from the partially completed weld and received by the ultrasonic assembly, and wherein information regarding the received ultrasonic signal is provided to the controller.

3. An apparatus as claimed in claim 1, and wherein the average time is utilized to calculate a sound speed, and wherein the sound speed is utilized by the controller to position the welding head to track the partially completed weld.

4. An apparatus as claimed in claim 1, and wherein the timing assembly electrically calculates a time it takes for the ultrasonic signal to be transmitted and returned to the ultrasonic assembly, and wherein the controller determines from the time, a width dimension of the partially completed weld.

5. An apparatus as claimed in claim 4, and wherein the width dimension is utilized to position the welding head to track the partially completed weld.

6. An apparatus as claimed in claim 1, wherein the ultrasonic signal has two components, a generated signal, and a reflected signal, and wherein the reflected signal is utilized to position the ultrasonic assembly relative to the partially completed weld.

7. An apparatus as claimed in claim 1, wherein the ultrasonic assembly includes at least two ultrasonic assemblies separated by a predetermined distance and located on the same side of the partially completed weld.

8. An apparatus as claimed in claim 1, wherein the ultrasonic assembly includes at least two ultrasonic assemblies separated by a predetermined distance and individually located on opposite sides of the partially completed weld.

9. A welding apparatus using ultrasonic sensing, comprising:
   a moveable welder having a selectively adjustable welding head for forming a partially completed weld in a weld seam defined between adjoining metal substrates;
   an ultrasonic assembly borne by the moveable welder for generating an ultrasonic signal which is directed toward the partially completed weld, and wherein the ultrasonic signal strikes the partially completed weld and is reflected back in the direction of the ultrasonic assembly;
   a timing assembly for calculating an average time that it takes for the ultrasonic signal to be transmitted and returned to the ultrasonic assembly; and
   a controller electrically coupled with the timing assembly, and which determines from the average time, a distance that the ultrasonic assembly is from the partially completed weld.

10. An apparatus as claimed in claim 9, wherein the distance determined from the average time is utilized to position the ultrasonic assembly relative to the partially completed weld.

11. An apparatus as claimed in claim 9, wherein the average time is utilized to position the welding head to track the partially completed weld.

12. An apparatus as claimed in claim 9, wherein the controller determines from the average time, a width dimension of the partially completed weld.

13. An apparatus as claimed in claim 12, and wherein the width dimension is utilized to position the welding head to track the partially completed weld.

14. An apparatus as claimed in claim 9, wherein the ultrasonic signal has two components, a generated signal, and a reflected signal, and wherein the reflected signal is utilized to position the ultrasonic assembly relative to the partially completed weld.

15. An apparatus as claimed in claim 9, and wherein the average time is utilized to calculate a sound speed, and wherein the sound speed is utilized to position the ultrasonic assembly relative to the partially completed weld.

16. An apparatus as claimed in claim 9, and wherein the average time is utilized to calculate a sound speed, and wherein the sound speed is utilized to position the welding head to track the partially completed weld.

17. An apparatus as claimed in claim 9, wherein the ultrasonic assembly includes at least two ultrasonic assemblies separated by a predetermined distance and located on the same side of the partially completed weld, and wherein the average time of the ultrasonic signal is utilized to position the at least two ultrasonic assemblies relative to the partially completed weld.

18. An apparatus as claimed in claim 9, wherein the ultrasonic assembly includes at least two ultrasonic assemblies separated by a predetermined distance and located on the same side of the partially completed weld, and wherein the average time of the ultrasonic signal is utilized to position the welding head to track the partially completed weld.

19. An apparatus as claimed in claim 9, wherein the ultrasonic assembly includes at least two ultrasonic assemblies separated by a predetermined distance and individually located on opposite sides of the partially completed weld, and wherein the average time of the ultrasonic signal is utilized to position the at least two ultrasonic assemblies relative to the partially completed weld.

20. An apparatus as claimed in claim 9, wherein the ultrasonic assembly includes at least two ultrasonic assemblies separated by a predetermined distance and individually located on the opposite sides of the partially completed weld, and wherein the average time of the ultrasonic signal is utilized to position the welding head to track the partially completed weld.

21. An apparatus as claimed in claim 9, wherein the ultrasonic assembly includes at least two ultrasonic assemblies separated by a predetermined distance and individually located on opposite sides of the partially completed weld, and wherein the average time is utilized to position the at least two ultrasonic assemblies relative to the partially completed weld.

22. An apparatus as claimed in claim 9, wherein the ultrasonic assembly includes at least two ultrasonic assemblies separated by a predetermined distance and individually located on opposite sides of the partially completed weld, and wherein the average time is utilized to position the welding head to track the partially completed weld.

23. An apparatus as claimed in claim 9, wherein the ultrasonic assembly includes at least two ultrasonic assemblies separated by a predetermined distance and individually located on opposite sides of the partially completed weld, and wherein the average time is utilized to calculate a width dimension of the partially completed weld.

24. An apparatus as claimed in claim 9, wherein the partially completed weld has a corner, and wherein the average time is utilized by the controller to calculate the distance between the ultrasonic assembly and the corner.

25. An apparatus as claimed in claim 9, wherein the partially completed weld has a sidewall, and wherein the average time is utilized by the controller to calculate the distance between the ultrasonic assembly and the sidewall.

26. An apparatus as claimed in claim 9, wherein the partially completed weld has a root, and wherein the average time is utilized by the controller to calculate the distance between the ultrasonic assembly and the root.

27. An apparatus as claimed in claim 9, wherein the ultrasonic signal utilized is a surface wave.

28. An apparatus as claimed in claim 9, wherein the ultrasonic signal utilized is a shear wave.

29. A welding apparatus using ultrasonic sensing, comprising:
a moveable welder having a selectively adjustable welding head for forming a partially completed weld in a weld seam defined between adjoining metal substrates;
an ultrasonic assembly borne by the moveable welder for generating an ultrasonic signal along a surface of the metal substrates, and which is directed toward the partially completed weld, and wherein the ultrasonic signal strikes the partially completed weld and is reflected back in the direction of the ultrasonic assembly;
a timing assembly for calculating an average time that it takes for the ultrasonic signal to be transmitted and returned to the ultrasonic assembly; and
a controller electrically coupled with the timing assembly and which utilizes the average time to calculate a distance that the ultrasonic generator is from the partially completed weld, and position the welding head to track the partially completed weld.

30. An apparatus as claimed in claim 29, wherein the distance calculated using the average time is utilized to position the ultrasonic assembly relative to the partially completed weld.

31. An apparatus as claimed in claim 29, wherein the controller determines from the average time, a width dimension of the partially completed weld.

32. An apparatus as claimed in claim 29, wherein the controller determines from the average time, a width dimension of the partially completed weld, and wherein the width dimension of the partially completed weld is utilized to position the welding head to track the partially completed weld.

33. An apparatus as claimed in claim 29, wherein the ultrasonic signal has two components, a generated signal, and a reflected signal, and wherein the reflected signal is utilized to position the ultrasonic assembly relative to the partially completed weld.

34. An apparatus as claimed in claim 29, and wherein the average time is utilized to calculate a sound speed, and wherein the sound speed is utilized to position the ultrasonic assembly relative to the partially completed weld.

35. An apparatus as claimed in claim 29, and wherein the average time is utilized to calculate a sound speed, and wherein the sound speed is utilized to position the welding head to track the partially completed weld.

36. An apparatus as claimed in claim 29, wherein the ultrasonic assembly includes at least two ultrasonic assemblies separated by a predetermined distance and located on the same side of the partially completed weld, and wherein the average time of the ultrasonic signal is utilized to position the at least two ultrasonic assemblies relative to the partially completed weld.

37. An apparatus as claimed in claim 29, wherein the ultrasonic assembly includes at least two ultrasonic assemblies separated by a predetermined distance and located on the same side of the partially completed weld, and wherein the average time of the ultrasonic signal is utilized to position the welding head to track the partially completed weld.

38. An apparatus as claimed in claim 29, wherein the ultrasonic assembly includes at least two ultrasonic assemblies separated by a predetermined distance and individually located on opposite sides of the partially completed weld, and wherein the average time of the ultrasonic signal is utilized to position the at least two ultrasonic assemblies relative to the partially completed weld.

39. An apparatus as claimed in claim 29, wherein the ultrasonic assembly includes at least two ultrasonic assemblies separated by a predetermined distance and individually located on opposite sides of the partially completed weld, and wherein the average time of the ultrasonic signal is utilized to position the welding head to track the partially completed weld.

40. An apparatus as claimed in claim 29, wherein the ultrasonic assembly includes at least two ultrasonic assemblies separated by a predetermined distance and individually located on opposite sides of the partially completed weld, and wherein the average time is utilized to position the at least two ultrasonic assemblies relative to the partially completed weld.

41. An apparatus as claimed in claim 29, wherein the ultrasonic assembly includes at least two ultrasonic assemblies separated by a predetermined distance and individually located on opposite sides of the partially completed weld, and wherein the average time is utilized to calculate a width dimension of the partially completed weld.

42. An apparatus as claimed in claim 29, wherein the partially completed weld has a corner, and wherein the average time is utilized by the controller to calculate the distance between the ultrasonic assembly and the corner.

43. An apparatus as claimed in claim 29, wherein the partially completed weld has a sidewall, and wherein the average time is utilized by the controller to calculate the distance between the ultrasonic assembly and the sidewall.

44. A welding apparatus using ultrasonic sensing, comprising:
a movable welder having a selectively adjustable welding head for forming a partially completed weld in a metal substrate;
an ultrasonic assembly borne by the moveable welder for generating an ultrasonic signal which is directed toward the partially completed weld, and wherein the ultrasonic signal is reflected off a bottom surface of the metal substrate before striking the partially completed weld, and wherein the ultrasonic signal strikes the partially completed weld and is reflected back in the direction of the ultrasonic assembly;
a timing assembly for calculating an average time that it takes for the ultrasonic signal to be transmitted and returned to the ultrasonic assembly; and
a controller electrically coupled with the timing assembly and determining from the average time, a distance that the ultrasonic assembly is from the partially completed weld.

45. An apparatus as claimed in claim 44, wherein the distance determined from the average time is utilized to position the ultrasonic assembly relative to the partially completed weld.

46. An apparatus as claimed in claim 44, wherein the average time is utilized by the controller to optimally position the welding head to track the partially completed weld.

47. An apparatus as claimed in claim 44, wherein the controller determines from the average time, a width dimension of the partially completed weld.

48. An apparatus as claimed in claim 44, wherein the controller determines from the average time, a width dimension of the partially completed weld, and wherein the width dimension of the partially completed weld is utilized to position the welding head to track the partially completed weld.

49. An apparatus as claimed in claim 44, wherein the ultrasonic signal has two components, a generated signal, and a reflected signal, and wherein the reflected signal is utilized to position the ultrasonic assembly relative to the partially completed weld.

50. An apparatus as claimed in claim 44, and wherein the average time is utilized to calculate a sound speed, and wherein the sound speed is utilized to position the ultrasonic assembly relative to the partially completed weld.

51. An apparatus as claimed in claim 44, and wherein the average time is utilized to calculate a sound speed, and wherein the sound speed is utilized to position the welding head to track the partially completed weld.

52. An apparatus as claimed in claim 44, wherein the ultrasonic assembly includes at least two ultrasonic assemblies separated by a predetermined distance and located on the same side of the partially completed weld, and wherein the average time of the ultrasonic signal is utilized to position the at least two ultrasonic assemblies relative to the partially completed weld.

53. An apparatus as claimed in claim 44, wherein the ultrasonic assembly includes at least two ultrasonic assemblies separated by a predetermined distance and located on the same side of the partially completed weld, and wherein the average time of the ultrasonic signal is utilized to position the welding head to track the partially completed weld.

54. An apparatus as claimed in claim 44, wherein the ultrasonic assembly includes at least two ultrasonic assemblies separated by a predetermined distance and individually located on opposite sides of the partially completed weld, and wherein the average time of the ultrasonic signal is utilized to position the at least two ultrasonic assemblies relative to the partially completed weld.

55. An apparatus as claimed in claim 44, wherein the ultrasonic assembly includes at least two ultrasonic assemblies separated by a predetermined distance and individually located on opposite sides of the partially completed weld, and wherein the average time of the ultrasonic signal is utilized to position the welding head to track the partially completed weld.

56. An apparatus as claimed in claim 44, wherein the ultrasonic assembly includes at least two ultrasonic assemblies separated by a predetermined distance and individually located on opposite sides of the partially completed weld, and wherein the average time is utilized to position the at least two ultrasonic assemblies relative to the partially completed weld.

57. An apparatus as claimed in claim 44, wherein the ultrasonic assembly includes at least two ultrasonic assemblies separated by a predetermined distance and individually located on opposite sides of the partially completed weld, and wherein the average time is utilized to position the welding head to track the partially completed weld.

58. An apparatus as claimed in claim 44, wherein the ultrasonic assembly includes at least two ultrasonic assemblies separated by a predetermined distance and individually located on opposite sides of the partially completed weld, and wherein the average time is utilized to calculate a width dimension of the partially completed weld.

59. An apparatus as claimed in claim 44, wherein the partially completed weld has a corner, and wherein the average time is utilized by the controller to calculate the distance between the ultrasonic assembly and the corner.

60. An apparatus as claimed in claim 44, wherein the partially completed weld has a sidewall, and wherein the average time is utilized by the controller to calculate the distance between the ultrasonic assembly and the sidewall.

61. An apparatus as claimed in claim 44, wherein the partially completed weld has a root, and wherein the average time is utilized by the controller to calculate the distance between the ultrasonic assembly and the root.

62. A welding method using ultrasonic sensing, comprising:
   providing a moveable welder having a selectively adjustable welding head for forming a partially completed weld;
   providing an ultrasonic assembly borne by the moveable welder for generating an ultrasonic signal which is directed toward the partially completed weld, and wherein the ultrasonic signal strikes the partially completed weld and is reflected back in the direction of the ultrasonic assembly;
   calculating an average time that it takes for the ultrasonic signal to be transmitted and returned to the ultrasonic assembly; and
   determining from the average time, a distance that the welding head is from the partially completed weld.

63. A method as claimed in claim 62, wherein the partially completed weld is formed in a weld seam defined between adjoining metal substrates having a bottom surface, and wherein the ultrasonic signal is reflected off the bottom surface of the metal substrate before striking the partially completed weld.

64. A method as claimed in claim 62, wherein the method further comprises:
   using the distance determined from the average time to position the ultrasonic assembly relative to the partially completed weld.

65. A method as claimed in claim 62, wherein the method further comprises:
   using the average time to position the welding head to track the partially completed weld.

66. A method as claimed in claim 62, wherein the method further comprises:
   determining from the average time, a width dimension of the partially completed weld.

67. A method as claimed in claim 62, wherein the method further comprises:
   determining from the average time, a width dimension of the partially completed weld, and utilizing the width dimension to position the welding head to track the partially completed weld.

68. A method as claimed in claim 62, wherein the ultrasonic signal generated by the ultrasonic assembly has two components, a generated signal, and a reflected signal, and wherein the reflected signal is utilized to position the ultrasonic assembly relative to the partially completed weld.

69. A method as claimed in claim 62, and wherein the average time is utilized to calculate a sound speed, and wherein the sound speed is utilized to position the ultrasonic assembly relative to the partially completed weld.

70. A method as claimed in claim 62, and wherein the average time is utilized to calculate a sound speed, and wherein the sound speed is utilized to position the welding head to track the partially completed weld.

71. A method as claimed in claim 62, wherein the providing an ultrasonic assembly further comprises:
   providing at least two ultrasonic assemblies separated by a predetermined distance and located on the same side of the partially completed weld, and wherein the average time of the ultrasonic signal is utilized to position the at least two ultrasonic assemblies relative to the partially completed weld.

72. A method as claimed in claim 62, wherein the providing an ultrasonic assembly further comprises:
   providing at least two ultrasonic assemblies separated by a predetermined distance and located on the same side of the partially completed weld, and wherein the average time of the ultrasonic signal is utilized to position the welding head to track the partially completed weld.

73. A method as claimed in claim 62, wherein the providing an ultrasonic assembly further comprises:
   providing at least two ultrasonic assemblies separated by a predetermined distance and individually located on opposite sides of the partially completed weld, and wherein the average time of the ultrasonic signal is utilized to position the at least two ultrasonic assemblies relative to the partially completed weld.

74. A method as claimed in claim 62, wherein the providing an ultrasonic assembly further comprises:
   providing at least two ultrasonic assemblies separated by a predetermined distance and individually located on opposite sides of the partially completed weld, and wherein the average time of the ultrasonic signal is utilized to position the welding head to track the partially completed weld.

* * * * *